Nov. 26, 1940.    J. GATTONI    2,222,658
PRECISION BALANCE
Filed Feb. 9, 1938
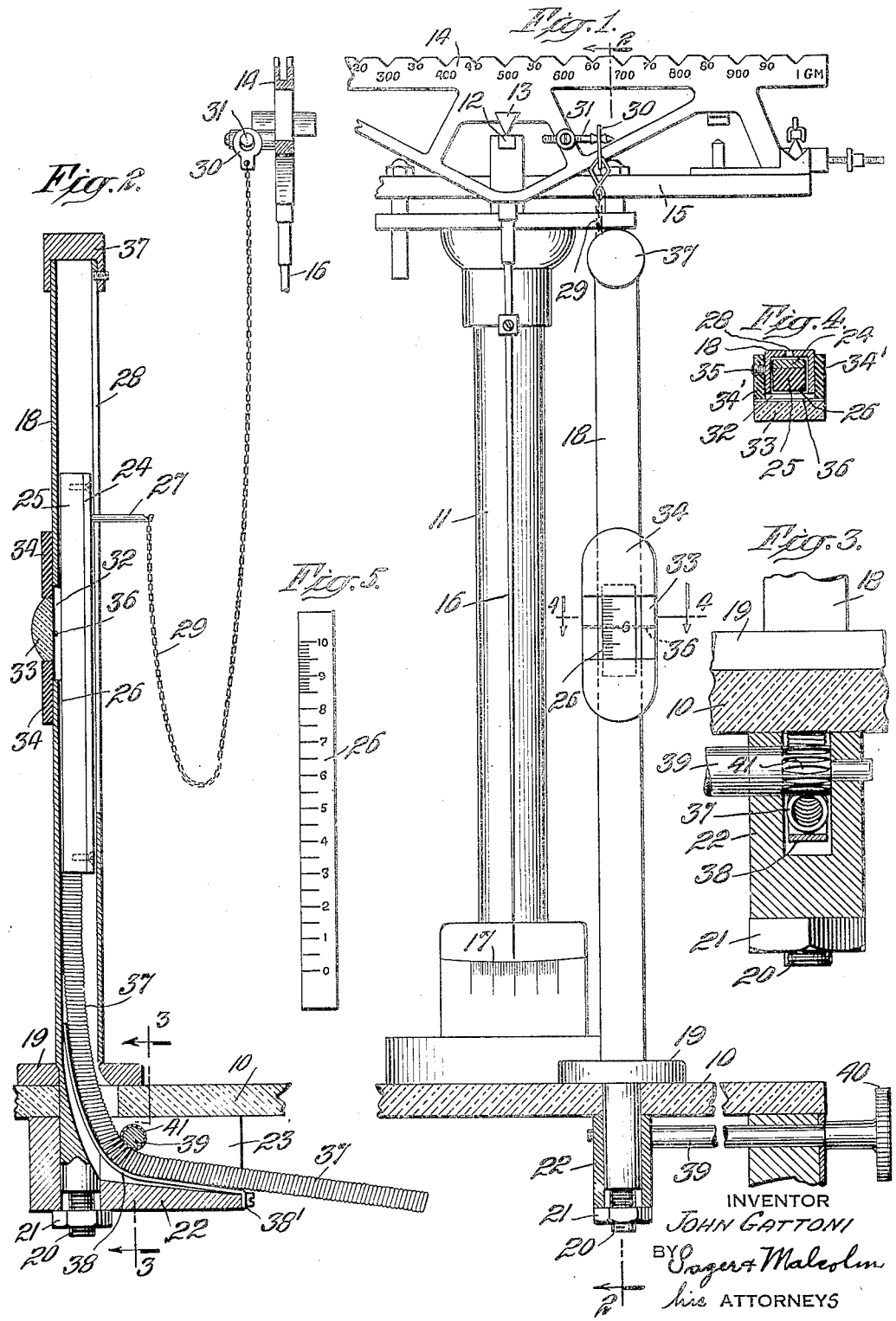
INVENTOR
JOHN GATTONI
BY Sagers & Malcolm
his ATTORNEYS Patented Nov. 26, 1940

2,222,658

UNITED STATES PATENT OFFICE 2,222,658

PRECISION BALANCE

John Gattoni, Union City, N. J., assignor to Seederer-Kohlbusch, Inc., Jersey City, N. J., a corporation of New Jersey Application February 9, 1938, Serial No. 189,482

3 Claims. (Cl. 265—60)

This invention relates to precision balances and particularly to the provision of an improved form of control of the adjustable cord or chain connected to the balance beam for securing a refined, graduated adjustment of weight imposed upon one side of the beam.

One object of the invention is to provide a simple form of construction which will be durable and dependable. Another object is to provide an improved form and relationship of parts which may be readily assembled and conveniently operated and adapted to be readily applied to any form or type of balance. Another object is to provide refined and accurate adjustment of the effective weight of the cord or chain imposed upon the balance beam and secure a high degree of accuracy of scale readings. Another object is to provide an improved form of construction which will permit the adjustment of the chain to perform the double function of adjustment of the zero position of the beam pointer and the imposing of any desired weight upon one side of the beam for weight determining purposes. Another object is to provide a pleasing appearance of the parts and suitably protect the movable portions of the apparatus. Other objects and advantages of this invention will be understood from the following description and accompanying drawing illustrating a preferred embodiment of the invention.

Fig. 1 is a front elevation of the improvement, partly in section and showing such portions of the instrument as needed for proper understanding; Fig. 2 is a vertical section on the line 2—2 of Fig. 1; Fig. 3 is an enlarged vertical section on the line 3—3 of Fig. 2; Fig. 4 is a horizontal section on the line 4—4 of Fig. 1; and Fig. 5 is a face view of the chain scale.

Referring to Fig. 1, the base 10 of the instrument is shown supporting the standard 11 having a bearing 12 for the knife edge support 13 of the beam 14. A vertically movable cradle 15 is provided for raising the scale beam from its bearing when not in use. The beam carries a downwardly extending pointer 16 which co-operates with the scale 17 of the instrument. These parts may be of any suitable form of construction and need not be further described, the form shown being illustrative of one such type of balance.

Mounted on the base is a vertically extending support 18 in the form of a square metal tube. Near its lower end a shoulder is provided which seats against the washer 19 on the base, the support 18 passing through the washer and through the base and is provided with a threaded lower end 20 carrying a clamping nut 21. Between this nut and the underside of the base is shown a metal block 22 which is clamped between the nut 21 and the underside of the base. This construction serves as a firm support for the vertical tube 18. The block 22 is provided with a vertically extending interior channel 23 which is open at the end opposite the clamping means and connects with the interior of the tube 18 through an opening in the base and through the washer 19, as well shown in Fig. 2.

The tube 18 encloses a vertically slidable element which is shown as having a back strip 24 of metal to which is secured a strip 25 which may be of hard rubber or other suitable material. The face of this strip 25 carries a scale 26 as shown in Fig. 5 which may be formed on the face of the strip or attached thereto. A pin 27 is secured to the back of the metal strip 24 near its upper end and projects out through a vertical slot 28 in the rear side of the tube 18. The chain or flexible cord 29 is secured at one end to the pin 27 and carries a ring 30 at its other end which loops over one end of an adjustable screw 31 secured to the beam 14 at one side of the knife edge bearing. The screw 31 has a V-shaped groove near its outer end which is adapted to receive and properly position the ring 30, the bearing portion of the ring 30 being provided with a proper bearing edge.

The face of the vertical tube 18 is provided with an opening 32 for the purpose of making the scale 26 visible in its various positions of adjustment. This opening is covered by a convex reading glass 33 supported by an element 34 covering a portion of the front of the tube 18 and also having rearwardly extending sides 34' which embrace opposite sides of the tube 18. The element 34 has a frictional engagement with the sides of the tube 18 so that it may be adjusted to some extent vertically along the tube 18. A screw 35, as shown in Fig. 4, passes through one side 34' and impinges against the side of the tube 18 for imposing the desired frictional engagement between the element 34 and the tube, although such a frictional engagement may be obtained in various other ways for securing ease of adjustment of the element 34. At the back of the glass 33 is a horizontal cross-wire 36 or other suitable indicating element which is carried by the sides of the element 34, as shown in Fig. 1. The top of the tube 18 is covered by a circular hood or cap 37.

In order to adjust the vertical position of the pin 27 and scale 26, a flexible element having a surface adapted to be engaged by a rotatable element is provided. In the preferred form shown, the flexible element is a closely coiled spring 37 which passes through the channel 23 of the base block 22 and is bent to pass into the tube 18 and up through the base 10. The upper end of the spring 37 forms a seat for the lower end of the vertically adjustable element 25. A bent strip of metal 38 is positioned under the spring in the channel 23 and is bent to pass into the tube 18 so as to form a smooth surface over which the spring may pass when adjusted to different positions. The strip 38 is fastened at its lower end 38' to the block 22 outside the end of the channel. The rotatable element for adjusting the spring 37 is shown as a shaft 39 which passes through one side of the base and has a handle 40 on its outer end. The inner end of the shaft 39 passes through the walls of the block 23 and has a bearing therein, as shown in Fig. 3. The shaft passes above the spring 37 and has a portion 41 cut with teeth adapted to engage the successive turns of the spring 37. This forms in effect, a rack and pinion wherein the part corresponding to the rack is flexible. It is evident that turning the shaft 39 and pinion 41 will cause the spring to travel within the tube 18 to any desired extent and thereby adjust the position of the chain pin 27, the weight of the parts serving to maintain the vertically moving element 25 in constant engagement with the upper end of the spring 37. By this form of construction the pin 27 may be adjusted to any desired position over a wide range because the bending of the spring below the top of the base permits it to travel in a substantially horizontal direction to any extent desired within the base. By positioning the pinion 41 at the inside knee of the bend of the spring 37, the pinion not only serves to hold the spring in a secure position against the guide 38 and in any adjusted position but also insures sufficient pressure of the spring against the pinion 41 so as to at all times maintain a firm contact between the spring and pinion and thereby secure a proper mesh at all times between these parts.

When using the instrument, the balance may be adjusted in the usual manner for securing the normal zero reading of the pointer 16 but this invention also provides a simple auxiliary means for the purpose of refined adjustment of the zero position of the pointer. This is readily accomplished by turning the handle 40 and thereby adjusting the effective weight of the chain 29 imposed upon the beam to bring the pointer 16 to the zero reading, assuming that there are no weights in the scale pans. After such adjustment the slidable element 34 may be raised or lowered to bring the cross-wire 36 opposite the zero reading of the scale 26. The instrument is then ready to make any desired measurements of weight.

In measuring the weights of small items, the weight may be found by placing the article in the pan which is on the opposite side of the beam from that to which the chain is connected. The weight may then be read directly from the scale 26 after the handle 40 has been adjusted to bring the pointer of the scale to its zero reading. In the instrument shown, each small graduation of the scale represents one-tenth milligram and the use of the chain alone has the capacity of measuring up to a range of ten milligrams. When weights of greater amounts are to be measured, the adjustment of the chain is used for obtaining refined adjustments of the counter-balancing weight, the weight of the article being represented by the known weights in the pan, the position of one or more riders on the scale beam, if such be used, and by the reading on the scale 26 as viewed through the reading glass 33.

Although a preferred embodiment of the invention has been described, the structure may be modified in various ways without departing from the scope thereof. The chain 29 may be replaced by any equivalent flexible means which may serve the same purpose; and the spring 37 may be replaced by any equivalent flexible means which will have the property of permitting adjustment and bending so as to deflect the same from the vertical position as it enters the base of the instrument.

I claim:

1. The combination with a balance having a scale beam of a chain having one end connected to the beam, a vertical tube secured at its lower end to the base of the balance, a movable element within said tube, the other end of the chain being connected to said movable element, a slidable, flexible element within said tube engaging said movable element and being maintained in contact therewith by the weight of said movable element, means within the base of the balance for guiding and bending said slidable element from a vertical to a substantially horizontal direction beneath the base of said balance, and means within the base of the balance engaging the upper side of said slidable element at the bend for adjusting the position thereof.

2. The combination with a balance having a base and a scale beam mounted on said base, of a chain having one end connected to the beam, a vertical tube secured at its lower end to the base of the balance, a movable element within said tube, the other end of the chain being connected to said movable element, a coiled spring extending within said vertical tube and engaging said movable element and having its lower end extending outside said tube in a substantially horizontal direction beneath said base, means on said base for guiding said coiled spring from a vertical to a substantially horizontal direction thereby permitting a substantial vertical movement of said movable element within said tube, and a pinion within the base engaging the exterior of said spring for adjusting said spring longitudinally and vertically.

3. The combination with a balance having a base and a scale beam mounted on said base, of a chain having one end connected to said beam, a vertical tube secured at its lower end to said base, a movable element within said tube, the other end of said chain being connected to said movable element, a coiled spring extending within said vertical tube and contacting with said movable element, a curved guiding surface for said coiled spring extending downwardly from said tube beneath the base of said balance and thereby bending said coiled spring so that it extends in a substantially horizontal direction beneath said base thereby permitting a substantial vertical movement of said movable element within said tube, and an actuating shaft having a pinion contacting with said coiled spring at the inside knee of the bend therein so as to hold said spring securely against said guiding surface while insuring firm contact between said spring and pinion for adjusting said spring in a longitudinal and vertical direction.

JOHN GATTONI.